US012780958B2

United States Patent
(12) United States Patent
Hui et al.

(10) Patent No.: US 12,780,958 B2
(45) Date of Patent: Nov. 3, 2026

(54) DIAPHRAGM FOR MINIATURE SOUND GENERATION DEVICE AND MINIATURE SOUND GENERATION DEVICE

(71) Applicant: GOERTEK INC., Weifang (CN)

(72) Inventors: Bing Hui, Weifang (CN); Chun Li, Weifang (CN); Fengguang Ling, Weifang (CN)

(73) Assignee: GOERTEK INC., Weifang (CN)

( * ) Notice: Subject to any disclaimer, the term of this patent is extended or adjusted under 35 U.S.C. 154(b) by 68 days.

(21) Appl. No.: 18/843,791

(22) PCT Filed: Mar. 9, 2023

(86) PCT No.: PCT/CN2023/080413

§ 371 (c)(1),
(2) Date: Sep. 4, 2024

(87) PCT Pub. No.: WO2023/246179

PCT Pub. Date: Dec. 28, 2023

(65) Prior Publication Data

US 2025/0171569 A1 May 29, 2025

(30) Foreign Application Priority Data

Jun. 21, 2022 (CN) ......................... 202210704504.6

(51) Int. Cl.

| | |
|---|---|
| ***C08F 8/32*** | (2006.01) |
| ***C08J 5/18*** | (2006.01) |
| ***H04R 7/02*** | (2006.01) |
| ***H04R 9/02*** | (2006.01) |
| ***H04R 9/06*** | (2006.01) |
| ***H04R 31/00*** | (2006.01) |

(52) U.S. Cl.

CPC .................. *C08F 8/32* (2013.01); *C08J 5/18* (2013.01); *H04R 7/02* (2013.01); *H04R 9/025* (2013.01); *H04R 9/06* (2013.01); *H04R 31/003* (2013.01); *C08F 2800/20* (2013.01); *C08F 2810/20* (2013.01); *C08F 2810/50* (2013.01); *C08J 2333/04* (2013.01); *H04R 2307/025* (2013.01)

(58) Field of Classification Search

CPC ........... C08J 5/18; C08J 2333/04; H04R 7/02; H04R 9/025; H04R 9/06; H04R 31/003; H04R 2307/025; C08F 2800/20; C08F 2810/20

USPC ........................................................ 381/400

See application file for complete search history.

(56) References Cited

U.S. PATENT DOCUMENTS

| | | | | |
|---|---|---|---|---|
| 2018/0054677 A1 | 2/2018 | Foglia et al. | | |
| 2023/0262394 A1* | 8/2023 | Ling | C08K 5/0025 | 381/423 |

FOREIGN PATENT DOCUMENTS

| | | | | |
|---|---|---|---|---|
| CN | 106465015 A | 2/2017 | | |
| CN | 109218924 A | 1/2019 | | |
| CN | 111836174 A | 10/2020 | | |
| CN | 111849103 A | 10/2020 | | |
| CN | 111866669 A | 10/2020 | | |
| CN | 111866671 A | 10/2020 | | |
| CN | 111935603 A | 11/2020 | | |
| CN | 111935606 A | 11/2020 | | |
| JP | 2014068141 A | 4/2014 | | |
| JP | 2015024511 A | 2/2015 | | |
| WO | WO-2021208473 A1 * | 10/2021 | | H04R 7/10 |

OTHER PUBLICATIONS

International Search Report from International Application No. PCT/CN2023/080413 mailed May 10, 2023.

* cited by examiner

*Primary Examiner* — Sean H Nguyen

(74) *Attorney, Agent, or Firm* — Shih IP Law Group, PLLC

(57) ABSTRACT

The present disclosure relates to the technology field of acoustic product. Disclosed are a diaphragm for miniature sound generation device and a miniature sound generation device. The diaphragm includes a rubber film layer formed by cross-linking reaction of an acrylate polymer, wherein the acrylate polymer contains carboxylic acid group, the cross-linking agent is an amine cross-linking agent. The present disclosure effectively improves the degree of cross-linking by using the acrylate polymer containing carboxylic acid group and the amine cross-linking agent, resulting in excellent resilience and temperature resistance of the diaphragm; At the same time, it allows the diaphragm forming method to be unrestricted and reduces preparation cost; It also improves the low-frequency performance of the miniature sound generation device, such that it has a full bass and a comfortable listening experience.

10 Claims, No Drawings

DIAPHRAGM FOR MINIATURE SOUND GENERATION DEVICE AND MINIATURE SOUND GENERATION DEVICE

TECHNICAL FIELD

The present disclosure relates to the technology field of acoustic product, and specifically, to a diaphragm for miniature sound generation device and a miniature sound generation device.

BACKGROUND

The sound generation device is an important acoustic component in consumer electronic product, and the sound generation device is used to convert electrical signal into sound. In recent years, the development of consumer electronic product has been rapid, especially with the rapid development of small electronic device such as mobile phone and tablet computer, there is a need for smaller and better-performing miniature sound generation device in these electronic devices. Under such application requirement, the performance of miniature sound generation device also needs to be further improved. In the sound generation device, a diaphragm is commonly used as the vibrating element for sound production, and the diaphragm plays an extremely important role in determining the sound-producing performance of the device, as it determines the quality of the conversion from electrical energy to sound energy.

Currently, the diaphragm of miniature sound generation device is mostly prepared from acrylic rubber material. However, during the process of realizing the Examples of this application, the inventors found that in the existing preparation of diaphragm using acrylic rubber, it typically only allows for cross-linking with sulfur or peroxide and the diaphragm can only be formed by compression molding. However, the molds used in the compression molding are expensive, leading to a high cost for preparing rubber diaphragm. Additionally, the temperature resistance of acrylic rubber needs further improvement.

Therefore, there is a need to provide a diaphragm with low preparation cost and excellent temperature resistance to solve the above problems.

SUMMARY

Based on the above, one embodiment of the present disclosure aims to provide a diaphragm for a miniature sound generation device and a miniature sound generation device that allows excellent resilience and excellent temperature resistance of the diaphragm, while making the molding method of the diaphragm unrestricted, and reducing the preparation cost.

The above purpose can be achieved through the following technical solutions:

According to one aspect of the present disclosure, the present disclosure provides a diaphragm for a miniature sound generation device, wherein the diaphragm includes a rubber film layer formed by cross-linking reaction of an acrylate polymer, wherein the acrylate polymer contains carboxylic acid group, and the cross-linking agent is an amine cross-linking agent.

Optionally, a monomer of the acrylate polymer includes vinyl unsaturated monocarboxylic acid and/or vinyl unsaturated dicarboxylic acid.

Optionally, the vinyl unsaturated monocarboxylic acid is one or more selected from acrylic acid, methacrylic acid, ethylacrylic acid, crotonic acid, and cinnamic acid.

Optionally, the vinyl unsaturated dicarboxylic acid is one or more selected from fumaric acid, maleic acid, glutaconic acid, allyl malonic acid, mesaconic acid, teraconic acid, itaconic acid, and citraconic acid.

Optionally, the acrylate polymer has a carboxylic acid group content of 0.1 wt % to 5 wt %.

Optionally, the amine cross-linking agent is added in an amount of 0.5 wt % to 5 wt % based on the mass of the acrylate polymer.

Optionally, the amine cross-linking agent is one or more selected from hexamethylenediamine, hexamethylenediamine salt, hexamethylenediamine carbamate, triethylenetetramine, 2,2'-methylenediphenylamine, and di-o-tolylguanidine.

Optionally, the glass transition temperature of the rubber film layer is −40° C. to −15° C.

Optionally, the rubber film layer has a recovery rate of 80% or more at a strain of 20%.

Optionally, the diaphragm is obtained by mixing the acrylate polymer with the cross-linking agent to obtain a mixed rubber, and processing the mixed rubber into a film through a film-forming process, followed by a molding treatment.

Optionally, the molding treatment is air pressure molding.

Optionally, the rubber has a hardness of 45 A to 85 A. Preferably, the rubber has a hardness of 50 A to 80 A.

Optionally, the rubber has a decrease rate of elongation at break of less than 55% after thermal aging in a 175° C. oven for 120 hours.

Optionally, the rubber has a tensile strength of 6 MPa to 35 MPa and a tear strength of 10 N/mm to 100 N/mm.

Optionally, the diaphragm has a thickness of 20 μm to 200 μm.

According to another aspect of the present disclosure, a miniature sound generation device is provided, which includes a vibration system and a magnetic circuit system that cooperates with the vibration system. The vibration system includes a diaphragm and a voice coil attached to one side of the diaphragm. The magnetic circuit system drives the voice coil to vibrate, thereby causing the diaphragm to generate sound. The diaphragm is the diaphragm for miniature sound generation device as described in the present disclosure.

Beneficial Effects

The diaphragm in the present disclosure is used for a miniature sound generation device. The diaphragm uses an acrylate polymer containing carboxylic acid group as the base rubber and an amine cross-linking agent as the cross-linking agent, and the cross-linking reaction method is changed, and therefore, the degree of cross-linking is effectively improved, thus making the molding method of the diaphragm unrestricted, giving the diaphragm excellent temperature resistance and excellent resilience, so that the diaphragm remains a high resilience even after long-term use in harsh environment, and the risk of collapse and rupture of the diaphragm during the long-term use is reduced. The miniature sound generation device prepared with the above diaphragm has good low-frequency performance, full bass, and comfortable listening experience.

DETAILED DESCRIPTIONS

If not specifically stated, the material and equipment used in the present disclosure are common material and equipment in the field. If not specifically stated, the methods used in the present disclosure are conventional methods in the field. Unless specifically stated, the meanings of the terms in this description are the same as the meanings generally understood by those skilled in the art, but if there is a conflict, the definitions in this description shall prevail. The terms "comprise", "include", "including", "contain", "have" or other variants are intended to cover non-limiting inclusions, and these terms are not distinguished from each other. The term "include" means that other steps and components may be added without affecting the final result. The term "include" also includes the terms "consist of" and "substantially consist of." The composition and method/process of the present disclosure include, consist of, and are substantially consist of the necessary elements and limitations described in this specification, as well as any additional or optional components, parts, steps, or limitations described in this specification.

All values or expressions related to component amounts, process conditions, etc., used in the specification and claims should be understood as being modified by "about." All ranges involving the same components or properties include the endpoints, the endpoint may be combined independently. Since these ranges are continuous, they include every value between the minimum and maximum values. It should also be understood that any numerical range cited in this application is expected to include all sub-ranges within that range.

As described in the background technology, the diaphragms of existing miniature sound generation devices are mostly made from acrylic rubber materials, and the preparation of diaphragms using acrylic rubber materials can generally only be cross-linked with sulfur or peroxides and is limited to compression molding. However, the molds used in the compression molding are expensive, leading to a high cost for preparing rubber diaphragm. After research, it was found that acrylic rubber diaphragms are limited by their cross-linking mechanism and can only be cross-linked with sulfur or peroxide, and sulfur or peroxide have a low degree of cross-linking or even no reaction in the presence of oxygen (oxygen may absorb free radical, thus hindering the cross-linking reaction), making it impossible for ACM rubber to be formed into diaphragm in an oxygen-rich environment, thus making the molding method only to be compression molding and cannot use a low-cost air pressure molding technology. Based on this, having studied and improved, the inventors achieve sufficient chemical cross-linking even in an oxygen-rich environment by using modified ACM and an amine cross-linking agent and changing the cross-linking reaction method, thereby not only improving the temperature resistance and resilience of the diaphragm but also making the molding process unrestricted, reducing the preparation cost, and providing strong support for subsequent promotion and application.

An embodiment of the present disclosure provides a diaphragm for a miniature sound generation device, the diaphragm includes a rubber film layer formed by cross-linking reaction of an acrylate polymer, wherein the acrylate polymer contains carboxylic acid group, and the cross-linking agent used in the cross-linking reaction is an amine cross-linking agent.

In an optional embodiment, a monomer of the acrylate polymer includes vinyl unsaturated monocarboxylic acid and/or vinyl unsaturated dicarboxylic acid. By using the aforementioned acrylate polymer, the reactivity is enhanced to allow for a full cross-linking reaction with the amine cross-linking agent to form a cross-linked structure, so that the rubber film layer has excellent temperature resistance and resilience.

Furthermore, the acrylate polymer may have the following structure:

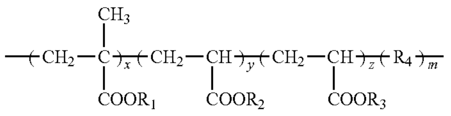

In the aforementioned structure, x, y, z, m are natural numbers; $R_1/R_2/R_3$ may be at least one of an alkyl main monomer such as ethyl main monomer, methyl main monomer, or n-butyl main monomer, or 2-methoxyethyl. An original polymerization monomer of $R_4$ is vinyl unsaturated monocarboxylic acid or vinyl unsaturated dicarboxylic acid. Furthermore, the vinyl unsaturated monocarboxylic acid may be one or more selected from acrylic acid, methacrylic acid, ethylacrylic acid, crotonic acid, and cinnamic acid. The vinyl unsaturated dicarboxylic acid is one or more selected from fumaric acid, maleic acid, glutaconic acid, allyl malonic acid, mesaconic acid, teraconic acid, itaconic acid, and citraconic acid. The acrylate polymer with the aforementioned structure is obtained by polymerizing the main monomer with the vinyl unsaturated carboxylic acid monomer, and a cyclic imine structure is formed by fully cross-linking the acrylate polymer with the aforementioned structure and the amine cross-linking agent, so that the temperature resistance of the diaphragm is significantly enhanced, the resilience of the diaphragm is good, and the diaphragm maintains good elasticity even after long-term use in harsh environment.

In an optional embodiment, the content of the carboxylic acid group in the acrylate polymer is 0.1 wt % to 8 wt %, for example, it may be 0.5 wt %, 1 wt %, 2 wt %, 3 wt %, 4 wt %, 5 wt %, 6 wt %, 7 wt %, etc. Preferably, the content of the carboxylic acid group in the acrylate polymer is 0.1 wt % to 5 wt %. In this embodiment, a cross-linked structure is formed by reacting the acrylate polymer with the amine cross-linking agent, and the content of the carboxylic acid group in the acrylate polymer is controlled, so that the low-temperature use requirement of the diaphragm are met, and the diaphragm has superior resilience even at a low-temperature environment of −20° C.

The inventors of this application, through research on the impact of the content of carboxylic acid group on the glass transition temperature and the elongation at break, found that when the content of carboxylic acid group in the acrylate polymer is 0.1 wt % to 8 wt %, the rubber formed by the cross-linking of the acrylate polymer containing carboxylic acid group with the amine cross-linking agent has a glass transition temperature of −40° C. to −15° C. and an elongation at break of not less than 100%, which meets the demand for low-temperature use of diaphragm and provides the diaphragm with a good high elasticity at low temperature. Moreover, it was also found that there is a high correlation between the glass transition temperature and the content of carboxylic acid group in the acrylate polymer. As the content of carboxylic acid group increases, the cross-linking points increase, the degree of cross-linking of the material increases and the movement of the molecular chain is restricted, thus leading to an increase in the glass transition temperature, an increase in the damping factor, and a decrease in the elongation at break and the elastic recovery rate. Preferably, the content of carboxylic acid group is 0.1 wt % to 5 wt %. This preferred range of carboxylic acid group content not only meets the demand for low-temperature use of diaphragm but also ensures that the diaphragm may maintain a high elastic state in a low-temperature environment, and will not exhibit a film rupture due to low-temperature intolerance over a long period of low-temperature use.

In an optional embodiment, the addition amount of the amine cross-linking agent is 0.5 wt % to 5 wt % of the acrylate polymer, for example, it may be 1 wt %, 2 wt %, 3 wt %, 4 wt %, 5 wt %, etc. This embodiment forms a cross-linked structure by reacting an acrylate polymer containing carboxylic acid group with an amine cross-linking agent, and controls the addition amount of the amine cross-linking agent, so that the cross-linking density and rate are effectively controlled, and the material has superior mechanical strength and resilience, thereby further reducing the risk of deformation, collapse, and rupture of the diaphragm during the long-term use, enhancing the using reliability of the diaphragm, and providing a good acoustic performance. When the polymer contains carboxylic acid group, since there are some unsaturated functional groups in its molecular chain, it can also use sulfur and/or peroxide to be cross-linked. However, sulfur and/or peroxide cannot undergo an effective cross-linking reaction in the presence of oxygen, and therefore air pressure molding cannot be used. To facilitate the molding of the diaphragm, this application only uses amine cross-linking agent for cross-linking, so as to facilitate the coating of the diaphragm and to facilitate air pressure molding.

In the process of implementing the various examples of the present disclosure, the inventors also found that when the addition amount of cross-linking agent is low, such as less than 0.5 wt %, the effective cross-linking density of the material formed by the cross-linking reaction is low, resulting in poor mechanical strength and resilience of the material. Diaphragm made from such material is prone to deformation and collapse during a long-term use, which leads to a decline in the acoustic Fr curve, and the vulcanization rate of the material is slow, thus severely limiting the production efficiency of the diaphragm and increasing the production cost of the diaphragm. Meanwhile, when the addition amount of cross-linking agent is too high, such as greater than 5 wt %, the effective cross-linking density of the material is excessively high, leading to a significant decrease in elongation at break and a decrease in damping. The prepared diaphragm is prone to polarization during vibration, which increases the acoustic distortion, and there is also a risk of film rupture during repeated vibration processes.

The preferred cross-linking agent for the present disclosure is an amine cross-linking agent, the amine cross-linking agent may be one or more selected from hexamethylenediamine, hexamethylenediamine salt, hexamethylenediamine carbamate, triethylenetetramine, 2,2'-methylenediphenylamine, and di-o-tolylguanidine. By using one or more of the amine cross-linking agents mentioned above and the carboxylic acid group in the acrylate polymer, sufficient cross-linking reaction may be performed to form a cyclic imine structure, thereby improving the temperature resistance and resilience of the material, and further reducing the risk of collapse and rupture of the diaphragm during use.

Additionally, although the acrylate polymer in the present disclosure contains unsaturated functional group and could theoretically be cross-linked using sulfur and/or peroxide cross-linking agent, the use of sulfur and/or peroxide cross-linking agent requires a stringent cross-linking and molding process, and especially in the presence of oxygen, the above cross-linking agent cannot undergo an effective cross-linking reaction (or may not react at all), so that the use of a low-cost air pressure molding process for preparing the diaphragm is impossible, and only compression molding can be used. Compression molding requires the use of expensive molds, which increases the cost of diaphragm preparation. In order to better solve the aforementioned problems, this application allows the amine cross-linking agent to fully cross-link with the carboxylic acid group in the acrylate polymer, and the cross-linking reaction method is changed. This not only improves the temperature resistance and resilience of the diaphragm, but also allows for a sufficient chemical cross-linking reaction to take place in an oxygen-rich environment. Moreover, the use of a low-cost air pressure molding for preparing the diaphragm is possible, mold costs are saved and the cost of diaphragm preparation is effectively reduced, thus providing strong support for subsequent promotion and application.

In an optional embodiment, the diaphragm is obtained by mixing the acrylate polymer with the cross-linking agent to obtain a mixed rubber, processing the mixed rubber into a film body through a film-forming process, drying the film body at a low temperature and then undergoing a molding treatment. This embodiment uses an acrylate polymer containing carboxylic acid group as the base rubber and an amine cross-linking agent as the cross-linking agent, the cross-linking method is changed, and a sufficient chemical cross-linking reaction can be achieved even in an oxygen-rich environment, thus overcoming the limitations in the existing diaphragm molding processes.

The molding process employs an air pressure molding. By using the acrylate polymer containing carboxylic acid group as the base rubber and the amine cross-linking agent as the cross-linking agent, an effective chemical cross-linking can be achieved during the air pressure molding process to form a cyclic imine structure. This solves the limitations of related art that can only use sulfur and/or peroxides to prepare diaphragm from acrylic rubber material through compression molding. Moreover, the cross-linking degree is increased, and the mechanical properties of the material are enhanced. The diaphragm has excellent temperature resistance and superior resilience, while the cost of diaphragm preparation is significantly reduced, thus providing strong support for subsequent promotion and application. Here, the air pressure molding has only one air pressure molding mold, a composite film layer formed by the rubber film layer and/or other film layer is attached to the air pressure molding mold, the molding mold is placed in a sealed chamber, and by inflating the sealed chamber with a gas, such as air, and applying heat, a high-temperature and high-pressure molding is performed. The present disclosure allows the amine cross-linking agent to react with the acrylate polymer containing carboxylic acid group, even if oxygen is present during the inflation process, and it does not affect the cross-linking reaction, thus not only effectively improving the degree of cross-linking but also overcoming the limitations of the related art.

The diaphragm may be formed by only a single layer of the rubber film layer; or it may be a multi-layer structure, such as two layers, three layers, etc. In the multi-layer structure, at least one layer is the rubber film layer, and other layers may be thermoplastic elastomer and/or engineering plastic. The thermoplastic elastomer may be at least one selected from thermoplastic polyester elastomer, thermoplastic polyurethane elastomer, thermoplastic polyamide elastomer, and silicone elastomer. The engineering plastic may be at least one selected from polyether ether ketone, polyarylate, polyetherimide, polyimide, polyphenylene sulfide, polyethylene naphthalate, polyethylene terephthalate, and polybutylene terephthalate.

In a preferred embodiment, the rubber crosslinked from the acrylate polymer containing carboxylic acid group and the amine cross-linking agent has a hardness of 45 A to 85 A, for example, the hardness may be 50 A, 60 A, 70 A, 80 A, etc. Preferably, the hardness is 50 A to 80 A. This embodiment uses the acrylate polymer containing carboxylic acid group as the base rubber and the amine cross-linking agent as the cross-linking agent, and by improving and optimizing the hardness of the crosslinked rubber, the material has an excellent elongation at break, and the temperature resistance of the diaphragm is enhanced, so that the diaphragm maintains high resilience even after long-term use in harsh environments, and the degree of decrease in resilience is slow, thereby improving the using reliability of the diaphragm.

The inventors of this application, through research on the decrease rate in elongation at break of rubbers with different hardnesses after thermal aging in a 175° C. oven for 120 hours, found that compared to conventional ACM rubber, the present disclosure significantly improves the temperature resistance of the material by forming a cyclic imine structure through the cross-linking of the acrylate polymer containing carboxylic acid group with the amine cross-linking agent. Under the above hardness formulations, the decrease rate in elongation at break of the rubber after thermal aging in a 175° C. oven for 120 hours is less than 55%, while the decrease rate for conventional ACM rubber is around 60%. Especially under the hardness formulation of 50 A to 80 A, the decrease rate in the elongation at break of the rubber is less than 53%, which greatly reduces the degree of resilience decrease in the long-term use of the diaphragm, making it more reliable under long-term harsh conditions, reducing the rate of acoustic distortion, and allowing the speaker to has an excellent sound quality even in long-term adverse environments.

Furthermore, the inventors of this application have found that within the aforementioned hardness range, the rubber film layer still has a recovery rate of 80% or more at a strain of 20%. This recovery rate allows the diaphragm to have a stronger ability to recover from deformation, so that the risk of collapse or rupture during the use of the diaphragm is significantly reduced, and at the same time, the speaker exhibits superior acoustic performance.

Preferably, the rubber crosslinked from the acrylate polymer and the amine cross-linking agent has a tensile strength of 6 MPa to 35 MPa and a tear strength of 10 N/mm to 100 N/mm. With these appropriate mechanical properties of the rubber, the prepared diaphragm is less likely to rupture during the module use, thus further enhancing the using reliability of the diaphragm.

In a preferred embodiment, the hardness of the rubber crosslinked from the acrylate polymer and the amine cross-linking agent in the present disclosure is 45 A to 85 A, and the thickness of the diaphragm is 20 μm to 200 μm, for example, the thickness may be 50 μm, 100 μm, 150 μm, 180 μm, etc. The inventors of this application comprehensively control the hardness of the rubber and the thickness of the diaphragm, and control the modulus and thickness of the sound generation device such as the speaker, so that the speaker has a lower F0 while the diaphragm has sufficient stiffness and damping. More preferably, the inventors found that when the hardness of the rubber is 50 A to 80 A and the thickness of the diaphragm is 20 μm to 200 μm, the diaphragm may have an excellent resilience, and the F0 of the speaker may reach 150 Hz to 1500 Hz, and the speaker may have excellent low-frequency performance, full bass and comfortable listening experience.

During the mixing process, other additives may also be added, such as reinforcing agent, antioxidant, vulcanization accelerator, etc., in addition to the cross-linking agent. The various additives are uniformly dispersed in the acrylate polymer through the shearing action and mixing of a Banbury mixer or an open mill, resulting in a uniformly dispersed mixed rubber. The additives are uniformly dispersed in the continuous base rubber through mixing, which is beneficial for the subsequent cross-linking reaction to form a crosslinked structure. Therein, reinforcing agent is added to enhance the strength of the diaphragm. For example, the addition of reinforcing agent may allow the crosslinked rubber to achieve the aforementioned hardness, thus reducing the decrease rate in the resilience of the diaphragm during long-term use. The reinforcing agent, for example, may be at least one of carbon black, carbonate, or metal oxide. The oxidation process of the polymer may be delayed or inhibited by adding the antioxidant, thus preventing the aging of the polymer and extending the service life thereof. The antioxidant, for example, may be Antioxidant 445. Vulcanization accelerator is added to promote the vulcanization, for example, it may be Vulcanization Accelerator TMTD or Vulcanization Accelerator D, etc. The above-listed additives are not limited to these and may be other reinforcing agent, antioxidant, vulcanization accelerator, or other additive that are well known to those skilled in the art but not listed in this embodiment. Here, the addition amount of cross-linking agent is 0.5 wt % to 5 wt % of the acrylate polymer, and there is no specific limit on the addition amount of other additive. Exemplary but not restrictive, for example: based on 100 parts of hydrogenated nitrile polymer, carbon black is 40 to 60 parts, the antioxidant is 2 to 5 parts, the vulcanization accelerator is 1 to 3 parts, and the cross-linking agent is 0.5 to 5 parts.

The film-forming process may be a coating or a rolling method. Taking the coating method as an example, the film-forming process may include dissolving the mixed rubber in a polar solvent to obtain a rubber solution, applying the rubber solution onto the surface of a mold such as a release film or a protective film to form a film body, and then conveying the continuously coated film body into a drying tunnel for low-temperature drying to obtain a strip; wherein, the polar solvent may be at least one of ethyl acetate, toluene, acetone, butanone, tetrahydrofuran, methyl formate, or butyl acetate. Furthermore, the thickness of the strip is 10 to 300 μm, preferably 25 to 200 μm, and the thickness tolerance of the strip is within ±5 μm, thereby ensuring the uniformity of the rubber film layer and making the diaphragm less likely to produce polarization.

During the film-forming process, the mixed rubber is controlled not to crosslink to ensure that the cross-linking reaction only occurs in the air pressure molding process. Optionally, the risk of cross-linking reaction of the rubber material is reduced by controlling the temperature and time in the film-forming process to ensure the performance of the diaphragm. More specifically, when dissolving, the temperature is controlled at 0 to 100° C., for example, 10° C., 30° C., 50° C., 90° C., etc. The inventors of this application have found that if the dissolution temperature is below 0° C., the solubility of the solvent is poor, and the mixed rubber cannot be effectively and uniformly dispersed; if the dissolution temperature is above 100° C., there is a risk of vulcanization reaction of the mixed rubber during the dissolution process, which may easily lead to solidification of the rubber solution. Preferably, the dissolution temperature is controlled at 20° C. to 70° C. This preferred temperature range can not only achieve an effective and uniform dispersion of the rubber material but also avoid the risk of cross-linking. During the low-temperature drying, the drying temperature is controlled at 30° C. to 140° C., for example, 50° C., 70° C., 90° C., 120° C., etc., and the time is controlled at 0.2 min to 30 min, for example, 1 min, 10 min, 20 min, etc. The inventors of this application have found that when the temperature inside the drying tunnel is below 30° C., the solvent in the coated film takes a longer time to evaporate, which severely affect the production efficiency, and the prepared strip has a high content of the residual solvent, which is not conducive to the subsequent preparation of the diaphragm. When the temperature is above 140° C., there is a risk of a premature cross-linking reaction in the coated film, which is not conducive to the stability of the material. Preferably, the drying temperature is controlled at 50° C. to 120° C., and the time is 0.5 min to 20 min, thereby improving the production efficiency, facilitating the subsequent molding and cross-linking for the preparation of the diaphragm, and reducing the risk of cross-linking reaction of the rubber material, thus ensuring the performance of the diaphragm and the acoustic performance of the sound generation device.

In a preferred embodiment, after the mixed rubber is dissolved to obtain the rubber solution, the solid content concentration of the solution is controlled at 10% to 45%, and the viscosity is 700 mPa·s to 85000 mPa·s, wherein the Solid content=(Quality of the mixed rubber/Quality of rubber solution)×100%. By controlling the solid content and viscosity of the rubber solution, the uniformity of the strip after coating is improved. The inventors of this application have found that the solid content of the rubber solution should not be too high or too low. When the solid content is too low, it will cause the rubber solution on the release film to have high fluidity, leading to a poor thickness uniformity of the surface of the coated strip. When the solid content is too high, the viscosity is very high, and the fluidity is poor, which may lead to a too long defoaming process, a poor flow on the release film, and a slower solvent evaporation rate in the drying tunnel, etc.

According to another aspect of the present disclosure, the present disclosure provides a miniature sound generation device, which includes a vibration system and a magnetic circuit system that cooperates with the vibration system. The vibration system includes a diaphragm and a voice coil attached to one side of the diaphragm. When the miniature sound generation device is operating, after the voice coil is energized, the voice coil may vibrate up and down under the driving force of the magnetic field of the magnetic circuit system, thereby driving the diaphragm to vibrate. The vibration of the diaphragm may generate sound. The miniature sound generation device such as a speaker using the diaphragm prepared according to the present disclosure has excellent low-frequency performance, full bass and comfortable listening experience, and has less swaying vibration during the vibration process, thus ensuring a more stable sound reproduction.

In order to better understand the above technical solutions of the present disclosure, the following specific examples will be used to provide a detailed explanation of the above technical solutions. The following specific examples are only preferred embodiments of the present disclosure and are not a limitation of the present disclosure.

Example 1

Formulation: Acrylate polymer base rubber: 100 parts; Carbon black N990:45 parts; Antioxidant 445:3 parts; Cross-linking agent hexamethylenediamine: 2.1 parts; Thiuram vulcanization accelerator: 2.3 parts. Among these, the original polymerization monomer of R4 in the structure of the acrylate polymer was acrylic acid, and the content of the carboxylic acid group in the acrylate polymer was 2 wt %.

1) The above 63 A formulation was banburied into a mixed rubber ACM-63.
2) The mixed rubber ACM-63 was placed in a solvent of butanone and butyl acetate to obtain an ACM-63 rubber solution; wherein the ratio of butanone to methylbenzene was 10:1, the solid content of the rubber solution was 25 wt %. They were stirred and dispersed at room temperature for 36 hours, filtered, and defoamed, and the viscosity was 7250 mPa·s.
3) The ACM-63 rubber solution was coated evenly and continuously on the surface of the release film from the position of the coating head, and the continuously coated material was sent into the drying tunnel with the release film for drying; wherein, the temperature of the drying tunnel was 70° C. to 110° C., the drying time in the tunnel was 7 min, thereby preparing a strip with a thickness of 120 μm.
4) The strip was prepared into a single-layer ACM rubber diaphragm with a thickness of 120 μm by using air pressure molding. The diaphragm has good temperature resistance, good resilience, meets low-temperature use requirements, and a speaker prepared with the diaphragm has excellent low-frequency performance, full bass, and comfortable listening experience.

Comparative Example 1

Formulation: Conventional unmodified acrylic ester base rubber: 100 parts; Carbon black N990:45 parts; Antioxidant 445:3 parts; Sulfur vulcanizing agent: 1 part; Tetramethylthiuram disulfide vulcanization accelerator: 1.5 parts.

The method of preparing the strip was similar to Example 1, there were no other differences, except that the viscosity of the rubber solution in step 2) was 5960 mPa·s. However, as for the strip prepared in Comparative Example 1, the material cannot be fully vulcanized and cross-linked during air pressure molding, the resilience of the prepared diaphragm is poor, and it cannot meet the use condition.

Examples 2-6

The preparation method was similar to Example 1, with the difference being that the cross-linking agent in the formulation used 2,2'-methylene diphenylamine, with an addition amount of 5 wt %, and the mass percentages of the carboxylic acid group in the acrylate polymer were 0.1 wt %, 0.5 wt %, 1 wt %, 5 wt %, and 8 wt %, respectively.

The diaphragms in the above Examples were all prepared by air pressure molding, and the diaphragms obtained in Examples 2-5 have excellent resilience and temperature resistance, meet the use requirement, and speakers prepared with these diaphragms have excellent low-frequency performance. Compared with Examples 2-5, the resilience of Example 6 decreases at temperature below 30° C.

At the same time, the inventors measured the glass transition temperature and elongation at break of the above formulations with different carboxylic acid group contents. Specifically, a rubber specimen was prepared by molding and cross-linking the mixed rubber with different carboxylic acid group contents as above, and the glass transition temperature and elongation at break of the rubber were measured. The measurement results are shown in Table 2.

In the measurement, the standards were as follows: the elongation at break was measured according to ASTM D412-2016 standard, the specimen had a dumbbell shape, the stretching rate was 500 mm/min, and each group of samples were measured 5 times and the average value was obtained. The glass transition temperature was measured according to ISO6721-4 standard, with a heating rate of 20° C./min. Each group of samples were measured 3 times and the average value was obtained.

TABLE 2

Measurement results of glass transition temperature and elongation at break

| | Example 2 | Example 3 | Example 4 | Example 5 | Example 6 |
|---|---|---|---|---|---|
| Mass percentage of the carboxylic acid group (wt %) | 0.1 | 0.5 | 1 | 5 | 8 |
| Glass transition temperature (° C.) | −35.5 | −34.9 | −33.2 | −29.6 | −23.1 |
| Elongation at break (%) | 368.1 | 369.4 | 353.7 | 298.5 | 273.9 |

Through the aforementioned Examples and measurement results thereof, it can be seen that by reacting carboxylic acid group with amine cross-linking agent to form a crosslinked structure, the carboxylic acid group content was within a certain range, the glass transition temperature of the rubber was −40° C. to −15° C., and the elongation at break was not less than 100%, thus meeting the low-temperature use requirement of the diaphragm. As shown in Table 2, the inventors of this application have found that as the content of carboxylic acid group increased, the number of cross-linking points increased, the degree of cross-linking of the material increased, and the movement of molecular chain was restricted, leading to an increase in the glass transition temperature, an increase in the damping factor, and a decrease in the elongation at break, resulting in a decrease in the elastic recovery rate of the diaphragm. As shown in Example 6, the glass transition temperature was increased, the elongation at break was slightly reduced, and the resilience of the diaphragm was decreased at temperature below 30° C., while Examples 2-5 still had a high resilience at temperature below 30° C. Therefore, it is preferred that the content of carboxylic acid group is 0.1 wt % to 5 wt %. This range not only meets the low-temperature use requirement of the diaphragm but also ensures that the diaphragm has good resilience during a long-term low-temperature use, without the phenomenon of film rupture due to low-temperature intolerance, thus improving the using reliability and enhancing the acoustic performance.

Examples 7-10

The preparation methods were similar to Example 1, with differences in the formulation where: the cross-linking agent used triethylenetetramine, with an addition amount of 2 wt %, and the hardness formulations were 50 A, 60 A, 70 A, and 80 A, respectively.

The above Examples were all prepared by air pressure molding to obtain a diaphragm, the diaphragm has good temperature resistance and resilience, and meets the use requirement. A speaker prepared by the diaphragm has excellent low-frequency performance.

At the same time, the inventor compared the decrease rate of the elongation at break of the rubber with the aforementioned hardness formula. Specifically, a rubber specimen was prepared by molding and cross-linking the mixed rubber with the aforementioned hardness formula. After thermal aging for 120 hours in a 175 C.° oven, the decrease rate in elongation at break of the rubber specimen was measured and compared with conventional ACM rubber. The specific measurement results are shown in Table 1.

Measurement standard: according to ASTM D412-2016 standard, the elongation at break was measured. The specimen had a dumbbell shape, with a tensile rate of 500 mm/min. Each group of samples were measured 5 times and the average value was obtained.

TABLE 1

Measurement results of the decrease rate of elongation at break of rubber specimen and conventional ACM rubber

| Hardness | 50A | 60A | 70A | 80A |
|---|---|---|---|---|
| Conventional ACM rubber | 56.1% | 57.8% | 63.4% | 67.3% |
| Rubber specimens in Examples 7-10 | 43.2% | 45.3% | 48.3% | 52.9% |

From the above Examples and measurement results, it can be seen that as compared to conventional ACM rubber, in the Examples with the aforementioned hardness formula of the present disclosure, by cross-linking the acrylate polymer containing carboxylic acid group with amine cross-linking agent to form a cyclic imine structure, the temperature resistance of the material was significantly improved. The rubber with the aforementioned hardness formula had been thermal aging in a 175° C. oven for 120 hours, the decrease rate of elongation at break were all less than 55%, which was significantly lower than the decrease rate of conventional ACM rubber. This allowed the diaphragm to maintain high resilience even under long-term harsh conditions, and the decrease rate of resilience was slow, the using reliability of the diaphragm was improved, the risk of film rupture was reduced, and the acoustic performance was excellent.

The description of the present disclosure is provided for illustrative and descriptive purposes, and is not exhaustive or limiting the present disclosure to the forms disclosed. Many modifications and variations are obvious to those skilled in the art. The selection and description of the implementation examples are to better illustrate the principles and practical applications of the present disclosure, and enabling those skilled in the art to understand the present disclosure and design various implementations suitable for specific purposes with various modifications.

What is claimed is:

1. A diaphragm for a miniature sound generation device, wherein the diaphragm comprises a rubber film layer formed by cross-linking reaction of an acrylate polymer, wherein the acrylate polymer contains carboxylic acid group, and the cross-linking agent is an amine cross-linking agent, wherein the acrylate polymer has a carboxylic acid group content of 0.1 wt % to 5 wt %, wherein the amine cross-linking agent is added in an amount of 0.5 wt % to 5 wt % based on the mass of the acrylate polymer.

2. The diaphragm for the miniature sound generation device as claimed in claim 1, wherein a monomer of the acrylate polymer comprises vinyl unsaturated monocarboxylic acid and/or vinyl unsaturated dicarboxylic acid.

3. The diaphragm for the miniature sound generation device as claimed in claim 2, wherein:

the vinyl unsaturated monocarboxylic acid is one or more selected from a group consisting of acrylic acid, methacrylic acid, ethylacrylic acid, crotonic acid, and cinnamic acid;

the vinyl unsaturated dicarboxylic acid is one or more selected from a group consisting of fumaric acid, maleic acid, glutaconic acid, allyl malonic acid, mesaconic acid, teraconic acid, itaconic acid, and citraconic acid.

4. The diaphragm for the miniature sound generation device as claimed in claim 1, wherein the amine cross-linking agent is one or more selected from a group consisting of hexamethylenediamine, hexamethylenediamine salt, hexamethylenediamine carbamate, triethylenetetramine, 2,2'-methylenediphenylamine, and di-o-tolylguanidine.

5. The diaphragm for the miniature sound generation device as claimed in claim 1, wherein the rubber film layer has a glass transition temperature of −40° C. to −15° C.

6. The diaphragm for the miniature sound generation device as claimed in claim 1, wherein the rubber film layer has a recovery rate of 80% or more at a strain of 20%.

7. The diaphragm for the miniature sound generation device as claimed in claim 1, wherein the diaphragm is obtained by mixing the acrylate polymer with the cross-linking agent to obtain a mixed rubber, and processing the mixed rubber into a film through a film-forming process, followed by a molding treatment; wherein the molding treatment is air pressure molding.

8. The diaphragm for the miniature sound generation device as claimed in claim 7, wherein the rubber has a hardness of 45 A to 85 A.

9. The diaphragm for the miniature sound generation device as claimed in claim 8, wherein the diaphragm has a thickness of 20 μm to 200 μm.

10. A miniature sound generation device, comprising a vibration system and a magnetic circuit system cooperating with the vibration system; wherein the vibration system comprises a diaphragm and a voice coil attached to one side of the diaphragm, the magnetic circuit system drives the voice coil to vibrate, thereby causing the diaphragm to generate sound, and the diaphragm is the diaphragm for miniature sound generation device as claimed in claim 1.

* * * * *